United States Patent
Kitahara

(10) Patent No.: US 7,108,003 B2
(45) Date of Patent: Sep. 19, 2006

(54) ULTRASONIC CLEANING APPARATUS

(75) Inventor: Shigenori Kitahara, Tosu (JP)

(73) Assignee: Tokyo Electron Limited, Tokyo-to (JP)

( * ) Notice: Subject to any disclaimer, the term of this patent is extended or adjusted under 35 U.S.C. 154(b) by 376 days.

(21) Appl. No.: 10/345,767

(22) Filed: Jan. 15, 2003

(65) Prior Publication Data

US 2003/0133851 A1 Jul. 17, 2003

(30) Foreign Application Priority Data

Jan. 16, 2002 (JP) .............................. 2002-006961

(51) Int. Cl.
*B08B 3/12* (2006.01)

(52) U.S. Cl. .................. 134/184; 134/56 R; 134/58 R; 134/902; 134/1.3; 310/317; 310/334; 366/114; 366/127

(58) Field of Classification Search ............. 134/1, 134/1.3, 56 R, 58 R, 184, 902; 310/317, 310/318, 328, 334; 366/114, 127
See application file for complete search history.

(56) References Cited

U.S. PATENT DOCUMENTS

| | | | |
|---|---|---|---|
| 2,891,176 A | * | 6/1959 | Branson .................... 310/317 |
| 4,909,266 A | * | 3/1990 | Massa ......................... 134/60 |
| 5,911,232 A | | 6/1999 | Mokuo et al. |
| 6,019,852 A | * | 2/2000 | Pedziwiatr et al. ............ 134/1 |
| 6,148,833 A | * | 11/2000 | Tang et al. .................. 134/184 |
| 6,181,051 B1 | * | 1/2001 | Puskas ................... 310/316.01 |
| 6,554,003 B1 | * | 4/2003 | Birang et al. ................ 134/1.3 |

FOREIGN PATENT DOCUMENTS

| JP | 8-196450 | * | 8/1996 |
|---|---|---|---|
| JP | 11-176784 | * | 7/1999 |

* cited by examiner

Primary Examiner—M. Kornakov
(74) Attorney, Agent, or Firm—Morrison & Foerster LLP

(57) ABSTRACT

Pluralities of ultrasonic transducers are arranged on the bottom wall of the cleaning tank. The output power of the ultrasonic oscillator is supplied to the transducers through the switching unit, which switches the drive mode between a first mode in which all the ultrasonic transducers are supplied with the output power and thus are excited, and a second mode in which only a part or parts of the ultrasonic transducers are supplied with the output power generated by the ultrasonic oscillator. The first mode is used when cleaning substrates not-resistant to vibration, and the second mode is used when cleaning substrates resistant to vibration.

6 Claims, 6 Drawing Sheets

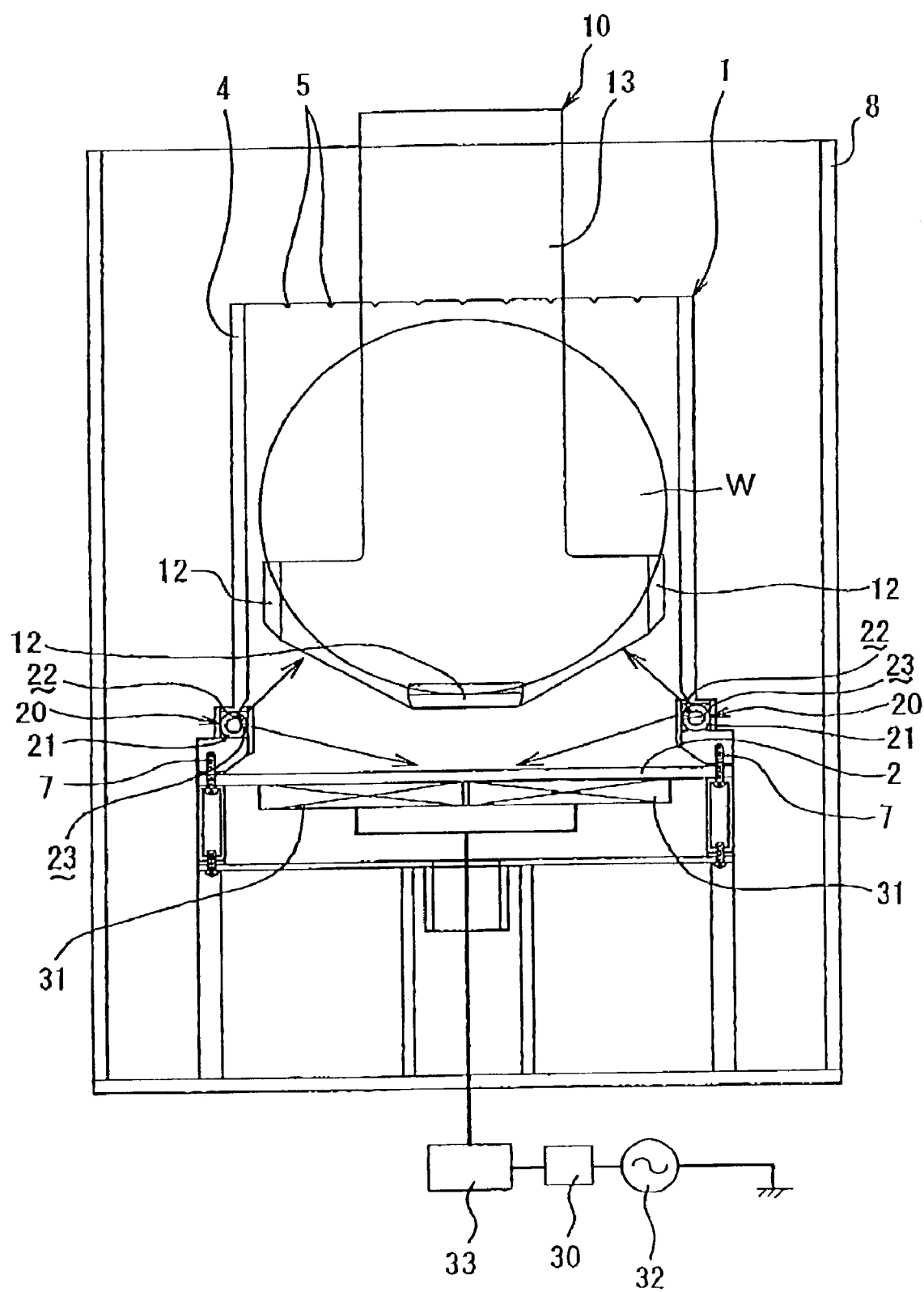
F I G. 2

ULTRASONIC CLEANING APPARATUS

BACKGROUND OF THE INVENTION

1. Field of the Invention

This invention relates to an ultrasonic cleaning apparatus, more specifically, to an apparatus that utilizes ultrasonic waves to clean substrates, for example, semiconductor wafers or LCD glass substrates.

2. Description of the Related Art

In the processing of semiconductor devices or LCDs, the wet-method for cleaning semiconductor wafers or LCD glass substrates by immersing them into a tank containing a chemical liquid or rinse liquids, etc., is widely utilized.

One example of a cleaning apparatus that implements the wet-cleaning method is an ultrasonic cleaning apparatus. Conventional ultrasonic cleaning apparatuses are primarily comprised of a quartz cleaning tank that holds cleaning liquids such as chemical fluids in which the semiconductor wafer is immersed, an intermediate tank that that holds vibration-propagating liquid such as pure-water in which the bottom portion of the cleaning tank is immersed, and an ultrasonic wave generating unit comprised of a stainless steel vibration transfer plate, on which ultrasonic transducers are affixed, arranged at a bottom portion of the intermediate tank.

With ultrasonic cleaning apparatuses like that mentioned above, semiconductor wafers held by a wafer guide are immersed in the cleaning tank that contains chemical fluids, the ultrasonic transducers are excited by the application of an appropriate high-frequency voltage, thereby generating ultrasonic wave. The ultrasonic wave propagates through the pure water in the cleaning tank, and removes particles etc. adhered to the wafers.

The acoustic pressure of the ultrasonic wave and processing time determines the efficiency of particle removal. Particles can be removed in a shorter amount of time if the acoustic pressure of the ultrasonic wave is high. Even if the acoustic pressure is low, particles can be removed by lengthening the processing time. Conventional ultrasonic cleaning apparatuses have been geared toward faster, high acoustic pressure processing, or slow, low acoustic pressure processing. With the former, damage to the wafer may result, and with the latter, the problem of low throughput is a concern.

Chemical liquids used with ultrasonic cleaning apparatuses include a mixture of ammonia solution and hydrogen peroxide solution called "SC1" ($NH_4OH/H_2O_2/H_2O$), a mixture of hydrochloric acid solution and hydrogen peroxide solution called "SC2" ($HCl/H_2O_2/H_2O$), and dilute hydrofluoric acid (DHF ,etc., and these are used according to the objective of the cleaning process. When these chemical liquids are used, dissolving of the quartz cleaning tank may occur, resulting in generation of metallic contamination. Also, with the dissolving of the cleaning tank, the through rate of sonic power may be affected, causing the possibility that cleansing efficiency may be worsened.

SUMMARY OF THE INVENTION

The present invention has been developed in consideration of the aforementioned circumstances, with the objective being to provide an ultrasonic cleaning apparatus that can improve the conditions for cleaning. These conditions may include a first condition of preventing damage to the object being processed, and a second condition of allowing for faster cleaning processing.

A further objective of the present invention is to improve upon the conditions for cleaning without complicating the construction of the apparatus.

A further objective of the present invention is to provide an ultrasonic cleaning apparatus having a plurality of ultrasonic transducers oscillated sequentially.

A further objective of the present invention is to prevent the cleaning ability of the apparatus from depleting over time.

In order to achieve the aforementioned objectives, the present invention provides an ultrasonic cleaning apparatus which includes: a cleaning tank adapted to hold a cleaning liquid; a substrate holder adapted to hold substrates in the cleaning tank;

a plurality of ultrasonic transducers arranged on a bottom wall of the cleaning tank; an ultrasonic oscillator that generates electric power for driving the ultrasonic transducers; a switching unit interposed between the ultrasonic transducers and the ultrasonic oscillator, the switching unit being configured to switch a drive mode between a first mode in which the plurality of ultrasonic transducers are supplied with the electric power generated by the ultrasonic oscillator and are thus excited, and a second mode in which only a part or parts of the plurality of ultrasonic transducers are supplied with the electric power generated by the ultrasonic oscillator and are thus excited.

In a specific embodiment, the plurality of ultrasonic transducers is aligned in a row; and the switching unit is configured to supply the electric power generated by the ultrasonic oscillator to the ultrasonic transducers, in the second mode, in such a manner that the ultrasonic transducers are sequentially excited from a first end side of the row toward a second end side of the row.

In another specific embodiment, the switching unit is configured to supply the electric power generated by the ultrasonic oscillator to the ultrasonic transducers in such a manner that a vibration energy generated by one of the ultrasonic transducers in the first mode, in which the plurality of ultrasonic transducers are excited, is smaller than that in the second mode, in which only a part or parts of the plurality of ultrasonic transducers are excited. Preferably, the first mode is used when cleaning substrates that are not resistant to vibration, or substrates having layers of specific patterns that are not resistant to vibration, and the second mode is used when cleaning substrates that are resistant to vibration, or substrates having layers of specific patterns that are resistant to vibration.

In another specific embodiment, the ultrasonic oscillator has a plurality of output terminals; the switching unit include a first switching device and a second switching device; the first switching device includes a plurality of switches that are electrically connected to the output terminals of the ultrasonic oscillator, respectively, each of the switches having a first terminal and a second terminal, the first terminals of the switches of the first switching device being electrically connected to the plurality of ultrasonic transducers, respectively, and the second terminals of the switches of the first switching device being electrically connected to the second switching device in such a manner that electric power outputted from the second terminals are combined and inputted to the second switching device; the second switching device has a plurality of terminals electrically connected to the ultrasonic transducers, respectively, the second switching device being configured to supply electric power inputted to the second switching device to only a part or parts of the ultrasonic transducers, selectively, via corresponding terminal or terminals of the plurality of terminals of the second switching device.

In another specific embodiment, the substrate holder is configured to hold the substrates in such a manner that the substrates are aligned in a row in a first direction and are arranged at regular intervals with a spacing being formed between adjacent substrates; and the ultrasonic transducers are aligned in a row in the first direction and are arranged at regular intervals with a gap being formed between adjacent ultrasonic transducers, the gap being smaller than the spacing.

The bottom wall of the cleaning tank may be made from a carbon-series material, typically amorphous carbon or silicon carbide. In this case, the ultrasonic transducers may be attached to the bottom wall via a reinforcement member.

In another specific embodiment, the substrate holder comprises a holding member extending in a horizontal direction and a vertical strut connected to an end of the holding member, the holding member is configured to hold the substrates in such a manner that the substrates are aligned in a row in the horizontal direction with a spacing being formed between adjacent substrates and that the substrates stand up vertically; and a drain port is formed in the bottom wall of the cleaning tank right below the vertical strut; and the apparatus further include a valve mechanism adapted to open and close the drain port.

The valve mechanism may be structured so that it includes: a valve member adapted to contact to an outlet portion of the drain port in an airtight and liquid-tight fashion in order to close the drain port; and a cylinder device that moves the valve member toward and away from the outlet portion.

The present invention further provides an ultrasonic cleaning apparatus which includes; a cleaning tank adapted to hold a cleaning liquid; a substrate holder adapted to hold substrates in the cleaning tank; a plurality of ultrasonic transducers arranged on a bottom wall of the cleaning tank; an ultrasonic oscillator that generates electric power for driving the ultrasonic transducers; a switching unit interposed between the ultrasonic transducers and the ultrasonic oscillator, the switching unit being configured to supply the electric power generated by the ultrasonic oscillator in such a manner that the plurality of ultrasonic transducers are excited sequentially in a designated order.

In a specific embodiment, the plurality of ultrasonic transducers are aligned in a row; and the switching unit is configured to supply the electric power generated by the ultrasonic oscillator to the ultrasonic transducers in such a manner that the ultrasonic transducers are sequentially excited from a first end side of the row toward a second end side of the row.

In another specific embodiment, the switching unit is has a input terminal to which the electric power generated by the ultrasonic oscillator is inputted and a plurality of output terminal electrically connected to the ultrasonic transducers, respectively, and the switching device is configured so that the input terminal is electrically connected to only a part or parts of the plurality of output terminals selectively.

According to another aspect of the present invention, an ultrasonic cleaning method is provided, which includes the steps of: placing substrates in a cleaning liquid held in a cleaning tank; and allowing a plurality of ultrasonic transducers, which are aligned in a row on a bottom wall of the cleaning tank, to be excited sequentially from the transducer arranged at first end of the row toward the transducer arranged at the second end of the row.

BRIEF DESCRIPTION OF THE DRAWINGS

FIG. 2 is a transverse cross-sectional view of the ultrasonic cleaning apparatus shown in FIG. 1;

DESCRIPTION OF THE PREFERRED EMBODIMENTS

A first preferred embodiment of the present invention will be explained below with reference to the attached drawings. The ultrasonic cleaning apparatus illustrated here is for the cleaning of semiconductor wafers.

Figure 1:
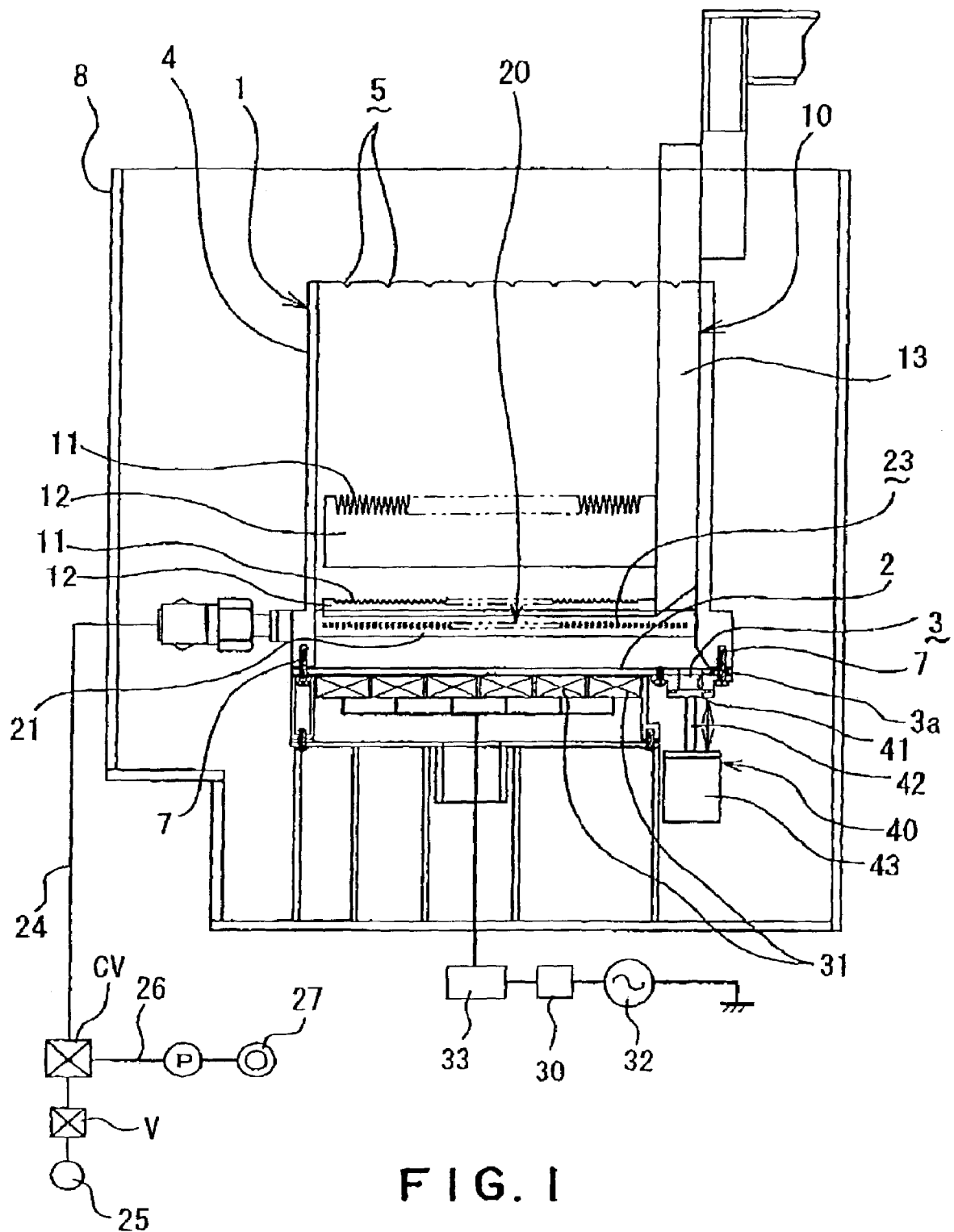
FIG. 1 is a longitudinal cross-sectional view of an ultrasonic cleaning apparatus according to the present invention, schematically showing the structure thereof.
Figure 3:
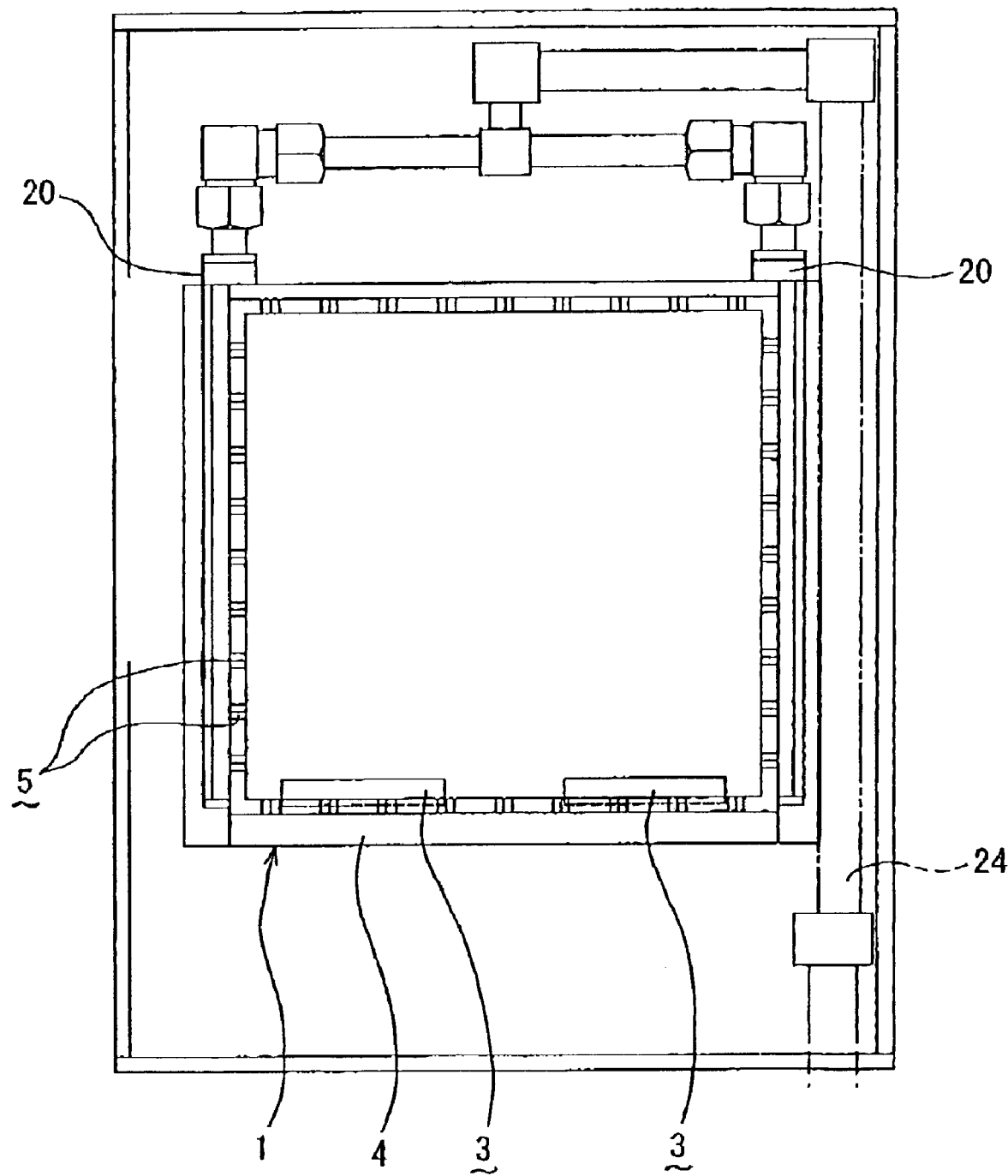
FIG. 3 is a top plan view of a cleaning tank of the ultrasonic cleaning apparatus shown in FIG. 1.

As depicted in FIG. 1 to FIG. 3, an ultrasonic cleaning apparatus has a cleaning tank 1. The cleaning tank 1 is comprised of side walls 4 made from a highly chemical resistant polytetrafluoroethylene (PTFE) or fluorine resin (PFA) and a bottom wall 2 made from a highly chemical resistant carbon-series material, such as amorphous carbon and silicon carbide. A series of V-notches 5 are provided at the upper end of each side wall 4 to guide any overflow of cleaning liquid from the inside of the cleaning tank 1 to an outer area. The bottom wall 2 is secured to the bottom portion of each side wall 4 by means of bolts 7. An airtight, liquid-tight seal is formed between the side walls 4 and the bottom wall 2 due to the existence of the packing 6 (see FIG. 5 (*a*)). In the case where the bottom wall 2 is made from amorphous carbon, the thickness of the bottom wall 2 is preferably 2.0 mm to 10.0 mm. A plurality of ultrasonic transducers 31, each of which is made from PTZ (lead Zirconate Titanate) and has a rectangular shape, are attached to the outer surface of the bottom wall 2.

As mentioned above, since the walls 2 and 4 of the cleaning tank 1 are formed from highly chemical resistant materials, even when corrosive cleaning liquids such as SC1, SC2, or DHF, etc., are used, the cleaning tank 1 is not dissolved by the chemical liquid and metal contamination can thus be prevented.

Since the heat expansion coefficient of the carbon-series material, such as amorphous carbon or silicon carbide, that forms the bottom wall 2 and that of the transducers 31 are substantially equal, change in the cleaning liquid temperature or heat produced by the transducers 31 does not alter the fixing condition of the transducers 31. Due to this, stabilized cleaning performance can be achieved. In addition, these carbon-series materials, as they are not dissolved by chemical liquids, the thickness of the bottom wall 2 is not altered through use. As a result, the through rate of sonic power of the bottom wall 2 is not altered through use, and therefore stabilized cleaning performance can be maintained over a long period of time.

The ultrasonic cleaning apparatus also has a wafer boat 10 that holds semiconductor wafers in place. The wafer boat 10 has a vertical strut 13 from which three holding bars 12 extend in a horizontal direction. Evenly spaced retaining grooves 11 are formed in each of the holding bars 12, into which the peripheral edge of a wafer is inserted. The wafer boat 10 can support a plurality of wafers W, for example 50 pieces, each in a perpendicular direction and aligned horizontally. By raising and lowering the vertical strut 13 with elevation means (not shown), a plurality of wafers supported by the holding bars 12 are immersed into cleaning liquid held by the cleaning tank 1, and removed from the cleaning tank 1 to a position above the cleaning tank 1.

Two cleaning liquid spray nozzles 20 are arranged inside the cleaning tank 1, these spray nozzles 20 extending in parallel in a horizontal direction at the bottom region of the cleaning tank 1. Each of the nozzles 20 is comprised of a tubular nozzle body 21 in which a plurality of nozzle holes 22 and 23 are formed. The nozzle holes 22 discharge cleaning liquid obliquely upward, and the nozzle holes 23 discharge the cleaning liquid obliquely downward. A supply pipe 24 is connected to the nozzle 20. The supply pipe 24 is connected to a pure water supply source 25 via a change valve CV and an open-close valve V. Chemical liquid supply pipe 26 is connected to the change valve CV, and connected to a chemical liquid tank 27, which is the chemical liquid supply source.

A pump P is provided in the chemical liquid supply pipe 26, to pump out the chemical liquid in the chemical liquid tank 27. Instead of the provision of the pump, pressurized gas such as nitrogen ($N_2$) gas may be supplied into the chemical liquid tank 27 to transfer the chemical liquid via pressurized gas to the chemical liquid supply pipe 26. Incidentally, the apparatus does not need to be limited to a single chemical liquid tank. A plurality of chemical liquid tanks may be provided to hold a variety of different chemical liquids, and to selectively provide chemical liquid from each tank to the supply pipe 24.

When the change valve CV is switched to the pure water supply 25 side and the open-close valve V opened, pure water provided from the pure water supply 25 is discharged from nozzle holes 22 toward the center of wafer W, and also discharged from nozzle holes 23 toward the center of the bottom wall 2 of the cleaning tank 1. When the change valve Cv is switched to the chemical liquid tank 27 side and the pump P is turned on, the chemical liquid provided from the chemical liquid tank 27 is discharged from the nozzles 20.

Cleaning liquid, specifically either pure water or chemical liquid that is supplied inside the cleaning tank 1 via the cleaning liquid spray nozzles 20, is guided by the notches 5 provided at the upper end of the side walls 4 and directed outside the cleaning tank 1. Cleaning liquid that has been directed outside is collected by a pan (not shown) arranged at the bottom of a container 8, which houses the cleaning tank 1. The liquid thus collected in the pan is then drained to the outside via a drain (not shown).

Figure 4:
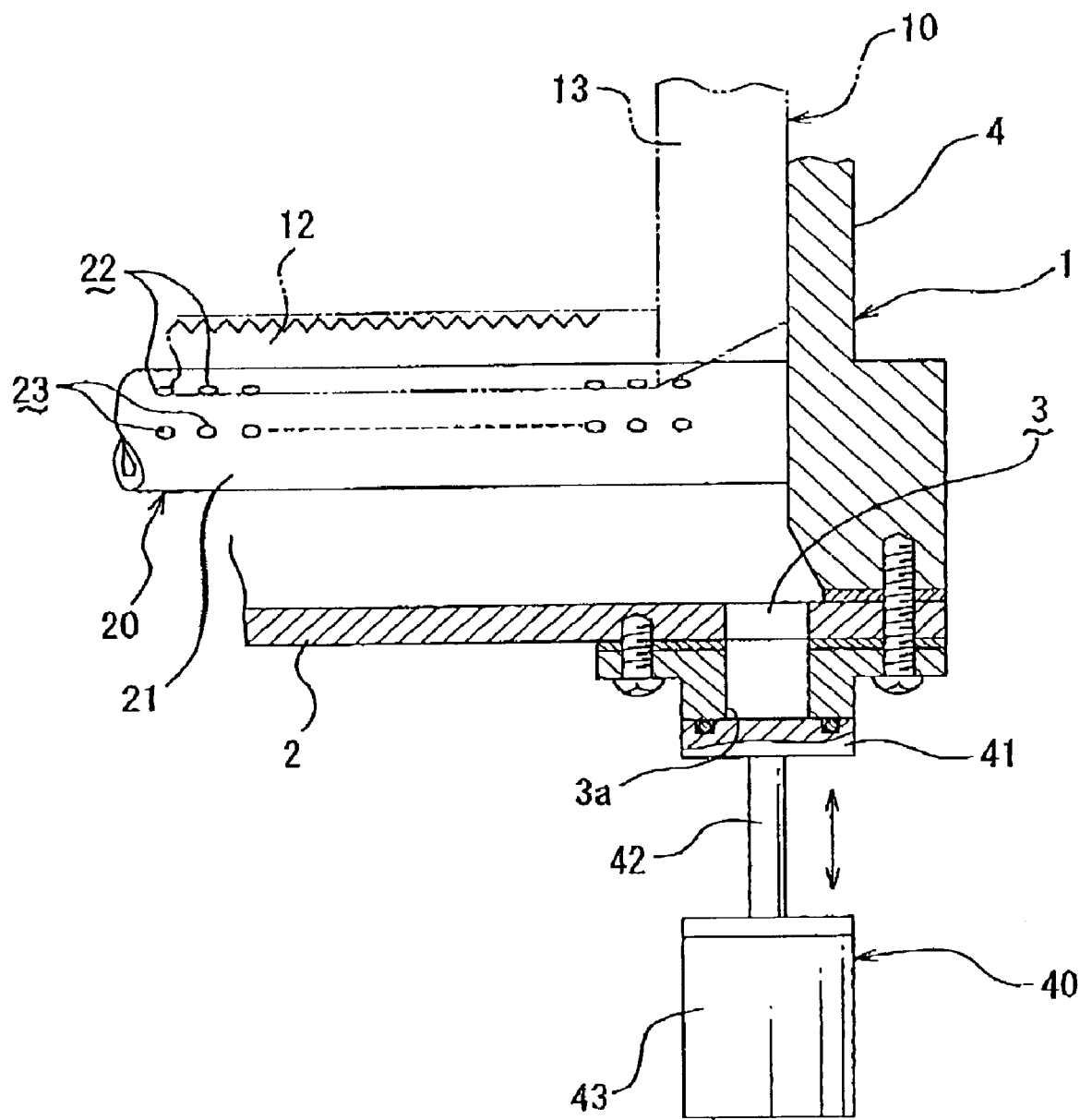
FIG. 4 is an enlarged cross-sectional view showing the structure in the vicinity of a drain port of the cleaning tank shown in FIG. 1.

Directly below the vertical strut 13 of the wafer boat 10, drain ports 3 are provided in the bottom wall 2 of the cleaning tank 1. Valve mechanism 40 is provided at each of the drain ports 3. The valve mechanisms 40, as shown in FIG. 1 and FIG. 4, has a valve element 41 adapted to contact outlet portion 3a of the drain port 3 in an airtight and liquid-tight fashion, and a cylinder device 43 with a piston rod 42. The piston rod 42 moves the valve element 41 toward and away from the outlet portion 3a of the drain port 3, allowing it to be opened and closed.

As shown in FIG. 3, two drain ports 3 are provided in the bottom wall 2 of the cleaning tank 1 , and are rectangular-shaped. However, the number and shape of the drain port 3 need not be limited to this illustration, a single opening or circular or elliptical shape being acceptable.

The ultrasonic transducers 31 cannot be placed where the drain ports 3 are located. However, as mentioned above, by avoiding the placing of the drain ports 3 directly below the wafers W, the transducers 31 can be uniformly placed directly under the wafers W. Due to this, the plurality of wafers W supported by the wafer boat 10 can be cleaned uniformly.

Also, due to the position of said drain ports 3, the bottom wall 2 can be kept flat, at least the portion directly under the wafers W. As a result, it is possible to uniformly clean a plurality of wafers W. Further, due to the aforementioned construction of the valve mechanism 40, cleaning liquid in the cleaning tank 1 can be drained in a short period of time, and thus the time required for exchange of the cleaning liquid can be shortened.

Next, the ultrasonic transducers 31 and a drive means for the transducers 31 will be explained in detail. Particularly as shown in FIG. 5(b), twelve ultrasonic transducers 31 are positioned in a 2×6 matrix pattern on the outer surface of the bottom wall 2 of the cleaning tank. The transducers 31 are affixed to the bottom wall 2 with an adhesive. In this case, the thickness of the bottom wall 2 can typically be 6.5 mm. Small gaps d1 and d2 are provided between the transducers 31, which are adjacent to one another. By providing the small gaps, the generation of particles caused by mutual rubbing of the transducers 31 can be prevented. Also, in the case where only a number of transducers 31 are excited, loss of vibration energy, which would be resulted from the transmission of vibration energy from an excited transducer to a not-excited adjacent transducer, can be avoided.

However, in order to achieve uniform cleansing of all wafers, it is preferable for the gaps d1 between the transducers 31 to be smaller than the spaces between the wafers as they are arranged on the wafer boat 10. Gaps d1 and d2 may be approximately 1 mm.

Figure 6:
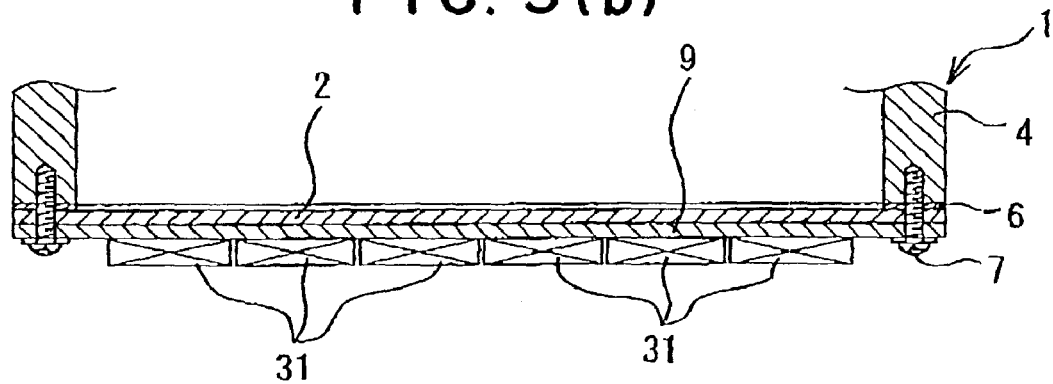
FIG. 6 is a cross-sectional view showing another arrangement of ultrasonic transducers.

In order for the bottom wall 2 to act as a vibration transfer plate, the thickness of the bottom wall 2 affects the through rate of sonic power, and thus affects the efficiency of the cleansing process. In the case where the thickness of the bottom wall 2 is lessened in consideration of this, it is conceivable that the strength of bottom wall 2 may be insufficient. In such a case, the bottom wall 2 may be reinforced with a reinforcement plate 9 made from a material, which has high strength and fracture toughness and allows a high through rate of sonic power, for example, stainless steel (see FIG. 6).

Figure 7:
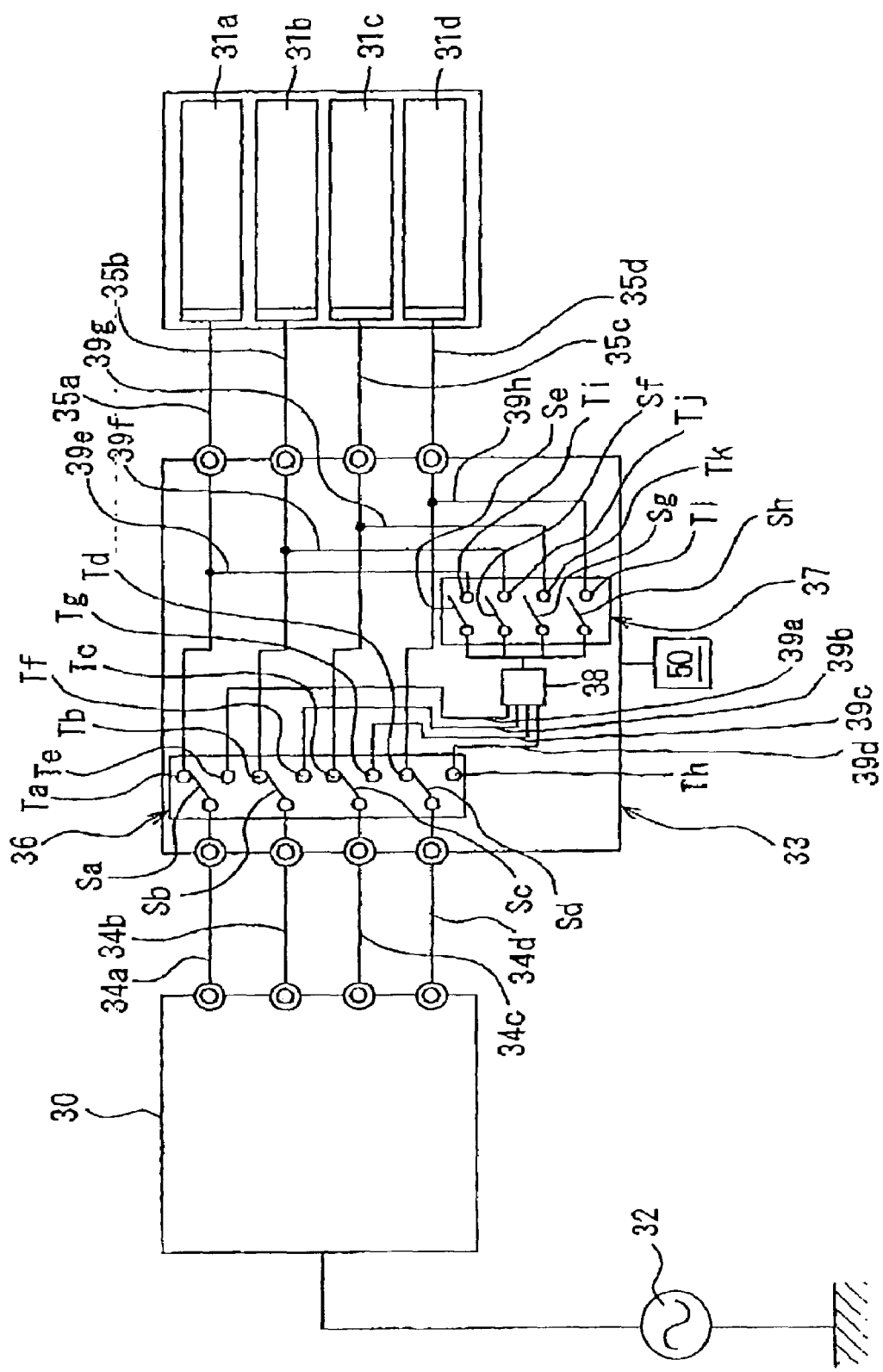
FIG. 7 is a diagram showing a switching circuit of the ultrasonic wave generating means.

Next, means for driving the ultrasonic transducers 31 will be explained in detail with reference to FIG. 7. For the purpose of simple explanation, FIG. 7 depicts the case where the number of transducers 31 is four. The transducers 31 are displayed with reference numerals 31a, 31b, 31c and 31d, in sequence from the top of FIG. 7.

An ultrasonic oscillator unit 30 receives an electric power from a power source 32, and generates electric power of ultrasonic frequencies, typically megasonic frequencies. The ultrasonic oscillator unit 30 has four output terminals, from each of which an ultrasonic-frequency power is supplied to a switching unit 33 through electric power supply lines 34a, 34b, 34c and 34d. The output powers from said four output terminals are equal to each other.

Switching unit 33 has a first switching device 36 and a second switching device 37. The first switching device 36 includes four switches each having a switch element (Sa, Sb, Sc and Sd), a first terminal (Ta, Tb, Tc and Td), and a second terminal (Te, Tf, Tg and Th). The switch elements Sa, Sb, Sc and Sd are electrically connected to electric power supply lines 34a, 34b, 34c and 34d, respectively. Each switch element (Sa, Sb, Sc and Sd) can be selectively connected to the corresponding first terminal (Ta, Tb, Tc, Td), or the corresponding second terminal (Te, Tf, Tg, Th). When switch elements Sa, Sb, Sc and Sd are connected to the first terminals Ta, Tb, Tc and Td, power provided through the electric power supply lines 34a, 34b, 34c and 34d is supplied to the ultrasonic transducers 31a, 31b, 31c and 31d.

Electric power supply lines 39a, 39b, 39c and 39d are connected to the second terminals Te, Tf, Tg and Th. The electrical current flowing through the power supply lines 39a, 39b, 39c and 39d is combined and enters the second switching device 37, via an impedance compensation circuit 38.

The second switching device 37 includes four switches, each having a switch element (Se, Sf, Sg, Sh), and a terminal (Ti, Tj, Tk, Tl). Electric power supply lines 39e, 39f, 39g and 39h are connected to the terminals Ti, Tj, Tk and Tf, respectively. These electric power supply lines 39e, 39f, 39g and 39h are connected to electric power supply lines 35a, 35b, 35c and 35d, and through these are connected to the ultrasonic transducers 31a, 31b, 31c and 31d.

As shown in FIG. 7, in the case where all switch elements Sa, Sb, Sc and Sd of the first switching device 36 are connected to corresponding terminals Ta, Tb, Tc and Td, electric current of first intensity is supplied to the ultrasonic transducers 31a, 31b, 31c and 31d. In other words, all of the transducers in the cleaning tank are excited. This is termed "all-drive mode." In the all drive mode, as the relatively small electric current is distributed evenly to all of the transducers, it is possible to uniformly clean the wafers in the cleaning tank with a relatively low level of vibration energy. The all-drive mode can be used effectively when cleaning wafer types that are not resistant to vibration, or wafers having layers of specific patterns (such as circuit patterns) that are not resistant to vibration.

When all switch elements Sa, Sb, Sc and Sd are connected to the second terminals Te, Tf, Tg, and Th, electric power supplied to the first switching device 36 via the electric power supply lines 34a, 34b, 34c and 34d is combined and flows to the second switching device 37, via the impedance compensation circuit 38. In this state, when one of the switch elements (Se, Sf, Sg or Sh) of second switching device 37 contacts the corresponding terminal (Ti, Tj, Tk or Tl), electric current of second intensity is supplied to the corresponding transducer (31a, 31b, 31c or 31d), thus causing it to be excited. This state is called "partial-drive mode." As is clear from the circuit diagram in FIG. 7, the second current intensity is larger than the first current intensity. Accordingly, the amount of vibration energy generated by a single transducer in the partial-drive mode is larger than that generated in the all-drive mode. Due to this, since wafers W above the ultrasonic transducer receive a relatively high level of sonic power, and thus they are cleaned with a high level of efficiency. The partial-drive mode can be used effectively when cleaning wafer types that are resistant to vibration, or wafers having layers of specific patterns resistant to vibration.

In partial-drive mode, ultrasonic transducers can be driven in the following types of patterns. Firstly, transducer 31a, positions at one end of the cleaning tank, is excited for a designated time, for example, between 5 and 20 seconds. Next, transducer 31b, adjacent to transducer 31a, is excited for a designated time. In this manner, after a single transducer is excited for a designated time, the next adjacent transducer is excited, and after the transducer 31d at the opposite end of the cleaning tank 1 is excited, the transducer 31a at said one end of the cleaning tank 1 is excited again. The aforesaid sequential excitation of the transducers is repeated for designated times. As a result, all of the wafers supported by the wafer boat can be cleaned by strong vibration energy. In the partial-drive mode, several transducers (for example, two adjacent transducers) may be excited simultaneously.

Figure 5A:
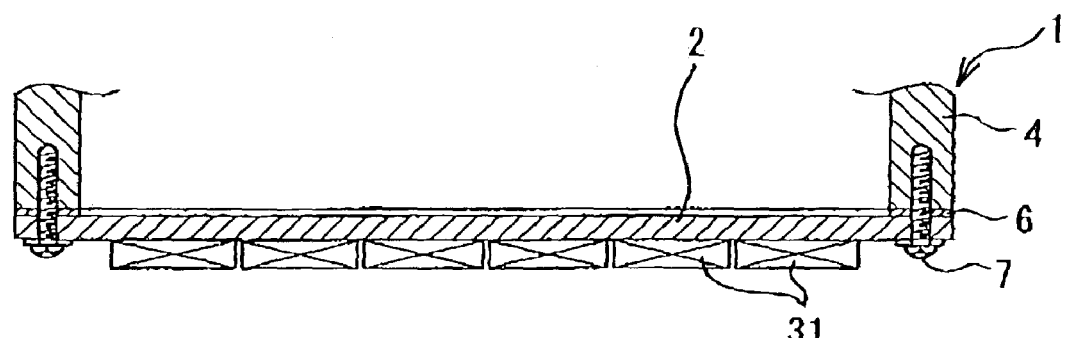
FIGS. 5(*a*) and 5(*b*) show an arrangement of ultrasonic transducers shown in FIG. 1, the former being a cross-sectional view, and the latter being a bottom plan view.
Figure 5B:
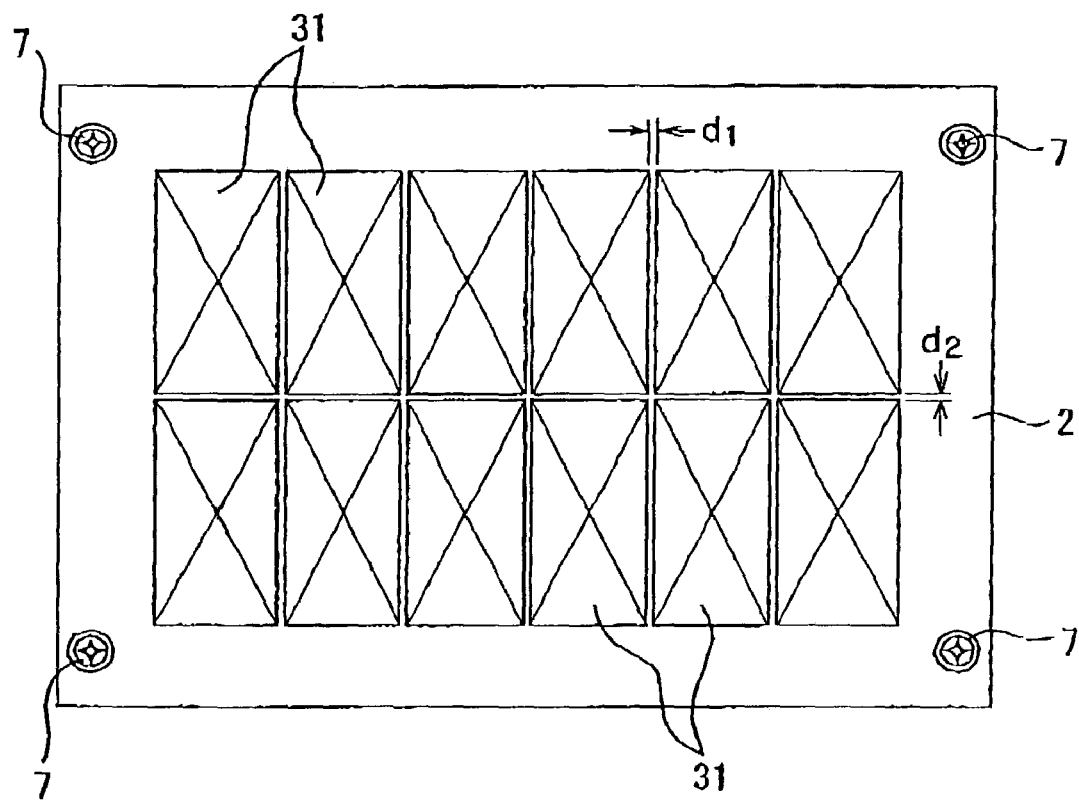

When driving a plurality of transducers 31, arranged as shown in FIG. 5, it is possible to use either the aforesaid all-drive mode or partial-drive mode. In the partial-drive mode, it is preferable that two adjacent transducers 31 with respect to the up and down direction of FIG. 5 (b) are excited simultaneously.

The impedance compensation circuit 38, in the partial-drive mode, compensates the impedance, making it possible for a larger current to be supplied to a particular ultrasonic transducer (relative to that of the all-drive mode).

A controller 50 controls the function of switching unit 33. Based on commands inputted by an operator or those of a pre-installed program, the function of switching unit 33 can be controlled. Switching between the all-drive mode and the partial-drive mode can be carried out via the controller 50. In addition, in the partial-drive mode, the number and order of transducers to be excited can be controlled.

Next, the operation of the ultrasonic apparatus will be explained.

First, pure water is supplied to the cleaning tank 1 from the pure water source 25. Next, a chemical liquid is supplied to the cleaning tank 1 from the chemical liquid tank 27 and mixed with the pure water. The cleaning tank 1 is filled until the surface of the liquid therein reaches the uppermost edge of the tank 1. SC1, SC2, DHF, etc., may be used as the chemical liquid.

Next, fifty wafers are transferred to the wafer boat 10 by the wafer conveyer (not shown). The wafer boat 10 is lowered, immersing the wafers supported in upstanding condition thereon into the chemical liquid. In this state, ultrasonic transducers 31 are excited, either in the all-drive mode or the partial-drive mode, and all transducers or a portion of the transducers are excited. The bottom wall 2 of the cleaning tank 1 vibrates due to the excitation of the transducers 31, thus causing the chemical liquid in the cleaning tank 1 to vibrate, and as a result, particles and other adherents that are adhering to the waters W can be removed.

While the ultrasonic cleaning process is being carried out, chemical liquid is continuously supplied to the cleaning tank 1 via the cleaning liquid spray nozzles 20. The chemical liquid overflows from the top of the cleaning tank 1, and particulates that have been removed from the wafers W and are floating on the surface of the chemical liquid spill out from the top of cleaning tank 1 to the outside, along with the overflowing chemical liquid. By this, it is possible to maintain the purity of the chemical fluid inside the cleaning tank 1.

The used liquid that is discharged from the cleaning tank 1 is collected in a pan (not shown) at the bottom of the container 8, and is discharged through a drain pipe (not shown).

After the cleaning process has been carried out for the designated time, supply of chemical liquid is stopped, and pure water is supplied to the cleaning tank 1 from pure water source 25 in place of the chemical liquid, and a rinse process is carried out.

After the entire cleaning process has been completed, the wafer boat 10 is raised, the wafers w are removed from the cleaning tank 1, and then transferred to the wafer conveyer (not shown).

When changing the cleaning liquid in the cleaning tank 1, the valve mechanisms 40 can be used. For example, after chemical liquid cleaning, cylinder device 43 of each valve mechanisms 40 is driven, discharging the chemical liquid from the cleaning tank 1. After this, pure water can be supplied to the cleaning tank 1 by the cleaning liquid supply nozzle 20. By doing so, cleaning fluid can be discharged from the cleaning tank 1 in a short period of time, and it becomes possible to change cleaning liquid in a shorter period of time.

While the embodiment depicted in FIG. 1 is structured to have a single tank comprising the cleaning tank 1, the present invention need not be limited as such. In other words, the cleaning tank 1 may be structured to have an inner tank to hold cleaning fluid, and outer tank to collect overflow. In this case, and cleaning liquid supply nozzles 20 located in an inner tank may be connected to the outer tank by way of a circulation route, and a circulation pump, etc., may be provided in the circulation route, forming a circulatory cleaning tank.

Also, ultrasonic oscillator unit 30 and switching unit 33 may be independent integrated units. Ultrasonic oscillator unit 30 and switching unit 33 may also be structured to be a single integrated unit that has the function of both. In such a case, ultrasonic oscillator unit 30 and switching unit 33 may be a part of a single integrated circuit.

What is claimed is:

1. An ultrasonic cleaning apparatus comprising:
a cleaning tank adapted to hold a cleaning liquid;
a substrate holder adapted to hold substrates in the cleaning tank;
a plurality of ultrasonic transducers arranged on a bottom wall of the cleaning tank;
an ultrasonic oscillator that generates electric power for driving the ultrasonic transducers; and
a switching unit interposed between the ultrasonic transducers and the ultrasonic oscillator, the switching unit configured to switch a drive mode between a first mode in which the plurality of ultrasonic transducers are supplied with the electric power generated by the ultrasonic oscillator and are thus excited, and a second mode in which only a part or parts of the plurality of ultrasonic transducers are supplied with the electric power generated by the ultrasonic oscillator and are thus excited, wherein:
the plurality of ultrasonic transducers are aligned in a row; and
the switching unit is configured to supply the electric power generated by the ultrasonic oscillator to the ultrasonic transducers, in the second mode, in such a manner that the ultrasonic transducers are sequentially excited from a first end side of the row toward a second end side of the row.

2. An ultrasonic cleaning apparatus comprising:
a cleaning tank adapted to hold a cleaning liquid;
a substrate holder adapted to hold substrates in the cleaning tank;
a plurality of ultrasonic transducers arranged on a bottom wall of the cleaning tank;
an ultrasonic oscillator that generates electric power for driving the ultrasonic transducers; and
a switching unit interposed between the ultrasonic transducers and the ultrasonic oscillator, the switching unit configured to switch a drive mode between a first mode in which the plurality of ultrasonic transducers are supplied with the electric power generated by the ultrasonic oscillator and are thus excited, and a second mode in which only a part or parts of the plurality of ultrasonic transducers are supplied with the electric power generated by the ultrasonic oscillator and are thus excited, wherein the switching unit is configured to supply the electric power generated by the ultrasonic oscillator to the ultrasonic transducers in such a manner that a vibration energy generated by one of the ultrasonic transducers in the first mode, in which the plurality of ultrasonic transducers are excited, is smaller than that in the second mode, in which oniy a part or parts of the plurality of ultrasonic transducers are excited, wherein:
the plurality of ultrasonic transducers are aligned in a row; and
the switching unit is configured to supply the electric power generated by the ultrasonic oscillator to the ultrasonic transducers, in the second mode, in such a manner that the ultrasonic transducers are sequentially excited from a first end side of the row toward a second end side of the row.

3. An ultrasonic cleaning apparatus comprising:
a cleaning tank adapted to hold a cleaning liquid;
a substrate holder adapted to hold substrates in the cleaning tank;
a plurality of ultrasonic transducers arranged on a bottom wall of the cleaning tank;
an ultrasonic oscillator that generates electric power for driving the ultrasonic transducers; and
a switching unit interposed between the ultrasonic transducers and the ultrasonic oscillator, the switching unit configured to switch a drive mode between a first mode in which the plurality of ultrasonic transducers are supplied with the electric power generated by the ultrasonic oscillator and are thus excited, and a second mode in which only a part or parts of the plurality of ultrasonic transducers are supplied with the electric power generated by the ultrasonic oscillator and are thus excited, wherein the switching unit is configured to supply the electric power generated by the ultrasonic oscillator to the ultrasonic transducers in such a manner that a vibration energy generated by one of the ultrasonic transducers in the first mode, in which the plurality of ultrasonic transducers are excited, is smaller than that in the second mode, in which only a part or parts of the plurality of ultrasonic transducers are excited, wherein:
the ultrasonic oscillator has a plurality of output terminals;
the switching unit includes a first switching device and a second switching device;
the first switching device includes a plurality of switches that are electrically connected to the output terminals of the ultrasonic oscillator, respectively, each of the switches having a first terminal and a second terminal, the first terminals of the switches of the first switching device being electrically connected to the plurality of ultrasonic transducers, respectively, and the second terminals of the switches of the first switching device being electrically connected to the second switching device in such a manner that electric power outputted from the second terminals are combined and inputted to the second switching device; and the second switching device has a plurality of terminals electrically connected to the ultrasonic transducers, respectively, the second switching device being configured to supply electric power inputted to the second switching device to only a part or parts of the ultrasonic transducers, selectively, via corresponding terminal or terminals of the plurality of terminals of the second switching device.

4. An ultrasonic cleaning apparatus comprising:
a cleaning tank adapted to hold a cleaning liquid;
a substrate holder adapted to hold substrates in the cleaning tank;
a plurality of ultrasonic transducers arranged on a bottom wall of the cleaning tank;
an ultrasonic oscillator that generates electric power for driving the ultrasonic transducers; and
a switching unit interposed between the ultrasonic transducers and the ultrasonic oscillator, the switching unit configured to switch a drive mode between a first mode in which the plurality of ultrasonic transducers are supplied with the electric power generated by the ultrasonic oscillator and are thus excited, and a second mode in which only a part or parts of the plurality of ultrasonic transducers are supplied with the electric power generated by the ultrasonic oscillator and are thus excited, wherein:
the substrate holder is configured to hold the substrates in such a manner that the substrates are aligned in a row in a first direction and are arranged at regular intervals with a spacing being formed between adjacent substrates; and
the ultrasonic transducers are aligned in a row in the first direction and are arranged at regular intervals with a gap being formed between adjacent ultrasonic transducers, the gap being smaller than the spacing.

5. An ultrasonic cleaning apparatus comprising:
a cleaning tank adapted to hold a cleaning liquid;
a substrate holder adapted to hold substrates in the cleaning tank;
a plurality of ultrasonic transducers arranged on a bottom wall of the cleaning tank;
an ultrasonic oscillator that generates electric power for driving the ultrasonic transducers; and
a switching unit interposed between the ultrasonic transducers and the ultrasonic oscillator, the switching unit configured to switch a drive mode between a first mode in which the plurality of ultrasonic transducers are supplied with the electric power generated by the ultrasonic oscillator and are thus excited, and a second mode in which only a part or parts of the plurality of ultrasonic transducers are supplied with the electric power generated by the ultrasonic oscillator and are thus excited, wherein:
the substrate holder comprises a holding member extending in a horizontal direction and a vertical strut connected to an end of the holding member, the holding member is configured to hold the substrates in such a manner that the substrates are aligned in a row in the horizontal direction with a spacing being formed between adjacent substrates and that the substrates stand up vertically;
a drain port is formed in the bottom wall of the cleaning tank right below the vertical strut; and
the apparatus further includes a valve mechanism adapted to open and close the drain port.

6. An ultrasonic cleaning apparatus comprising:
a cleaning tank adapted to hold a cleaning liquid;
a substrate holder adapted to hold substrates in the cleaning tank;
a plurality of ultrasonic transducers arranged on a bottom wall of the cleaning tank;
an ultrasonic oscillator that generates electric power for driving the ultrasonic transducers; and
a switching unit interposed between the ultrasonic transducers and the ultrasonic oscillator, the switching unit being configured to supply the electric power generated by the ultrasonic oscillator in such a manner that the plurality of ultrasonic transducers are excited sequentially in a designated order, wherein:
the plurality of ultrasonic transducers are aligned in a row; and
the switching unit is configured to supply the electric power generated by the ultrasonic oscillator to the ultrasonic transducers in such a manner that the ultrasonic transducers are sequentially excited from a first end side of the row toward a second end side of the row, wherein the switching unit has an input terminal to which the electric power generated by the ultrasonic oscillator is inputted and a plurality of output terminals electrically connected to the ultrasonic transducers, respectively, and the switching unit is configured so that the input terminal is electrically connected to only a part or parts of the plurality of output terminals selectively.

\* \* \* \* \*